United States Patent [19]

Prigorovsky et al.

[11] 4,088,913
[45] May 9, 1978

[54] ELECTRICAL MACHINE STATOR

[76] Inventors: Igor Alexandrovich Prigorovsky, Basseinaya ulitsa, 53, kv. 4; Anatoly Denisovich Ignatiev, Basseinaya ulitsa, 85, kv. 162; Vladimir Emmanuilovich Shkolnik, Bukharestskaya ulitsa, 39, korpus 3, kv. 22; Garri Mikhailovich Khutoretsky, Altaiskaya ulitsa, 20, kv. 5, all of Leningrad; Alexandr Ivanovich Vorontsov, ulitsa Khazova, 43, kv. 94, Pushkino Leningradskoi oblasti; Vladimir Markovich Fridman, Grazhdansky prospekt, 13, korpus 1, kv. 170, Leningrad, all of U.S.S.R.

[21] Appl. No.: 659,724

[22] Filed: Feb. 20, 1976

[51] Int. Cl.² ............................................. H02K 3/46
[52] U.S. Cl. ..................................... 310/260; 310/270
[58] Field of Search ..................... 310/260, 270, 194; 267/166

[56] References Cited

U.S. PATENT DOCUMENTS

| 3,089,048 | 5/1963 | Bahn et al. | 310/260 |
| 3,949,257 | 4/1976 | Cooper et al. | 310/260 |
| 3,974,409 | 8/1976 | Loy | 310/260 |
| 3,988,625 | 10/1976 | Jager et al. | 310/260 |
| 3,991,334 | 11/1976 | Cooper et al. | 310/260 |

FOREIGN PATENT DOCUMENTS

| 1,366,320 | 6/1964 | France | 310/260 |

Primary Examiner—Donovan F. Duggan
Attorney, Agent, or Firm—Lackenbach, Lilling & Siegel

[57] ABSTRACT

According to the invention, an electrical machine stator comprises a housing, a core, a winding mounted on the core, the upper and lower bars of said winding being connected in pairs in the end winding portion so as to form heads, a supporting member installed in said housing, which supporting member is constructed, in accordance with the invention, as a ring having a cylindrical projection whose height corresponds to the length of the end winding up to the heads, the stator being further provided with brackets whose supporting surfaces are arranged at an angle to the internal surface of the cylindrical projection, there being arranged wedges in the space between the internal surface of the cylindrical projection and the supporting surfaces of the brackets, which wedges are held in place by elastic members. The proposed stator is intended for high-power electrical machines, where it is necessary to ensure reliable fastening of the end winding in different operating conditions.

8 Claims, 2 Drawing Figures

ELECTRICAL MACHINE STATOR

The present invention relates to electrical machines and, more particularly, to electrical machine stators. Stators according to the invention can be used in high-power electrical machines in which it is necessary to reliably secure the end winding for different operating conditions.

The problem of securing the end winding of an electrical machine stator, mainly, of a turbogenerator, is vital as far as reliability is concerned. It is known that the end winding of a stator is subject to great electrodynamic loads both in normal and abnormal operating conditions. The level of such loads is continuously increasing as a result of the growing power output of electrical machines.

In addition, a stator winding is subject to great thermal loads and, consequently, to thermal elongation in varying operating conditions.

Hence, the end winding of a stator must be secured so as to withstand great and recurrent electrodynamic loads. On the other hand, it must be designed so as to allow for displacement of the winding as a result of thermal elongation in order to avoid impermissible mechanical stresses in the conductor and insulation of the winding and thus rule out damage of both the conductor and insulation. To summarize, the end winding must be secured so as to meet both conditions that have been indicated above, namely, it must be rigidly secured and movable at the same time.

There is known an electrical machine stator, wherein the end winding is secured so as to provide for axial movement thereof. The end winding is mounted on a rigid insulation ring which rests upon the stator housing and is movable relative to the latter. Arranged between the ring and the housing are wedges which are compressed in the axial direction by springs so as to develop radial forces.

Yet, because of the rigidity of said supporting ring, the radial forces are not transmitted to the end winding. Thus, the radial forces do not provide for permanently rigid fastening of the end winding; nor do they help to control the width of the gaps between the bars of the end winding and the fastening elements, which gaps are brought about by electrodynamic and thermal loads. The slot and end portions of the stator winding are acted upon by forces different in origin and direction. The action of these forces upon the junction between the slot and end portions of the winding is unknown.

There is further known an electrical machine stator provided with a device for the attachment of the end winding. This type of stator comprises a core with compressing plates at its ends, and a winding whose end portion is secured by brackets, each of said brackets resting upon two fingers of a rectangular cross-section. Each of said fingers is movable in the axial direction relative to a supporting member secured to an annular protrusion of the compressing plate.

This type of stator does not include any elements to support the entire movable winding attachment system in the radial direction; nor does it include any means to control the width of the gap between the end portion of the winding and the attachment elements.

It is an object of the present invention to provide for an electrical machine stator having a device to secure the end portions of the stator winding, which device would make for sufficiently rigid attachment of the end winding so that it could withstand great electrodynamic loads in the course of operation and, at the same time, would make the end portions of the winding movable in cases of thermal loads, and make it possible to control the width of the gap between the end portion of the winding and the attachment elements.

The foregoing object is attained by providing an electrical machine stator comprising a housing, a core, a winding mounted on said core, the upper and lower bars of said winding being connected in pairs so as to form heads, a supporting member arranged in the stator housing, said supporting member being constructed, in accordance with the invention, as a ring having a cylindrical projection whose height corresponds to the length of the end portion of the winding up to the heads, the stator further including brackets whose supporting planes are arranged at an angle to the internal surface of the cylindrical projection, there being installed wedges in the spacing between the internal surface of the cylindrical projection and the supporting planes of said brackets, which wedges are held in place by elastic members.

It is expedient that on the internal surface of the cylindrical projection of the supporting member there should be provided guide slots for the wedges, said guide slots being rectangular in shape and extending in the axial direction.

It is also expedient that on the side of the head of the end winding, each wedge should be provided with a protrusion to support the elastic member.

It is advisable that the elastic member should be made from a non-magnetic titanium alloy having a modulus of elasticity between $1 \cdot 10^6 \text{kgf/cm}^2$ and $1.3 \cdot 10^6 \text{kgf/cm}^2$.

The invention ensures sufficient rigidity of the attachment of the end portions of the winding while the electrical machine is in operation, and at the same time makes the end portions of the winding movable in cases of thermal loads.

The rectangular guide slots for the wedges make it possible to simplify the wedge manufacturing process and account for less stringent requirements as regards the surface finish of the wedges.

The provision of each wedge with a protrusion simplifies the attachment of the elastic member.

Other objects and advantages of the present invention will become more apparent from the following detailed description of preferred embodiment thereof, to be read in conjunction with the accompanying drawings, wherein.

Figure 1:
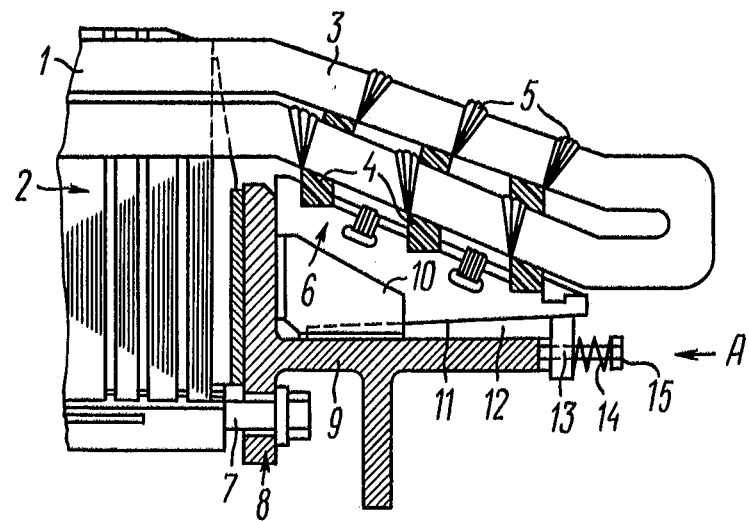
FIG. 1 is an elevation view of a portion of a stator in accordance with the invention.

Referring now to the attached drawings, the proposed electrical machine stator comprises a winding 1 (FIG. 1) laid in slots of a core 2 and having bars 3, an upper one and a lower one, which are connected so as to form a head. The bars 3 are joined together by binding insulation rings 4 and cord 5.

The binding rings 4 are rigidly secured to a bracket 6. The brackets 6 (FIG. 2) are uniformly spaced along the circumference of the stator. The foregoing assembly is placed in a housing (not shown). The core 2 (FIG. 1) is oriented in the axial direction with the aid of bracing ribs 7 and supporting members 8. Each supporting member 8 is constructed as a ring having a cylindrical projection 9. The height of the cylindrical projection 9 corresponds to the length of the end portion of the winding 1 up to the head of the bars 3. The bracket 6 is arranged between guides 10 attached to the supporting member 8. The bracket 6 has a supporting plane 11 arranged at an angle to the internal surface of the cylindrical projection 9.

Arranged between the supporting plane 11 and the internal surface of the cylindrical projection 9 are wedges 12 provided with beard-like protrusions 13. The protrusion 13 is compressed by elastic members 14, which are springs, and bolted to the cylindrical projection by bolts 15. The wedges 12 (FIG. 2) are received in guide slots 16 which are rectangular in cross-section and extend in the axial direction.

Figure 2:
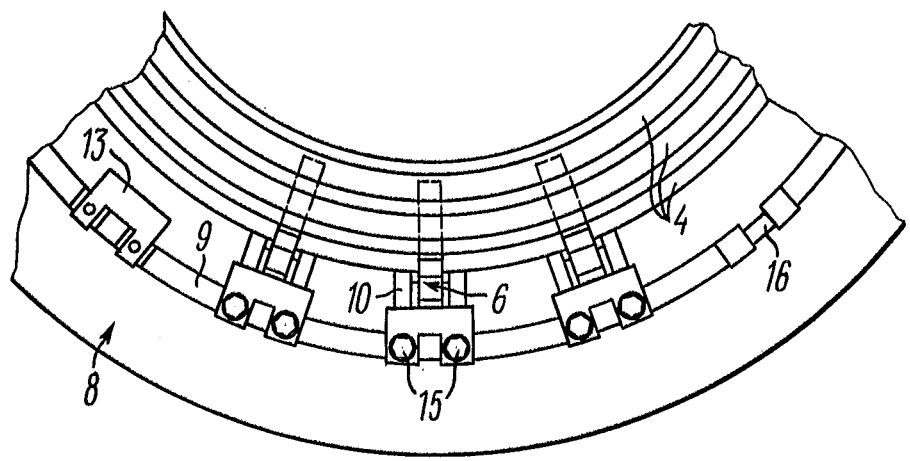
FIG. 2 is a view in the direction of the arrow A of a portion of a stator in accordance with the invention.

While the stator is in operation, the rigidity of the assembly is ensured by radial forces produced by the wedges 12 (FIG. 1) and the elastic members 14 in relation to the cylindrical projection 9 of the supporting member 8. The elastic members 14 are made from a non-magnetic titanium alloy having a modulus of elasticity between $1.10^6$ and $1.3.10^6$ kgf/cm$^2$. As the winding 1 is elongated under the action of heat, the brackets 6, the end portion of the winding 1 and the wedges 12 start moving in the slots 16 (FIG. 2) relative to the guides 10 (FIG. 1).

However, the direction in which the wedges 12 extend accounts for a narrower gap between the supporting plane 11 of the bracket 6 and the internal surface of the cylindrical projection 9. Besides, while moving in the axial direction away from the core 2, the wedge 12 additionally compresses the elastic members 14, which accounts for additional forces acting upon the wedge 12 in the axial direction and on the winding 1 in the radial direction. As the winding 1 is cooled, its length is reduced. As this takes place, the wedge 12 moves towards the core 2 under the action of the elastic members 14, whereby the gap between the supporting plane 11 of the bracket 6 and the internal surface of the cylindrical projecton 9 becomes narrower, and a radial force is produced. As a result, the entire end portion of the winding 1 becomes sufficiently rigid and can effectively withstand electrodynamic and thermal loads both in normal and abnormal operating conditions.

The stator of the present invention is highly reliable, adjustable, convenient in operation, and simple to manufacture and assemble.

What is claimed is:

1. An electrical machine stator comprising: a housing; a core; a winding mounted on said core and having upper bars and lower bars, associated pairs of upper and lower bars forming heads at the end portion of the winding; a supporting member arranged in said housing and constructed as a ring having a cylindrical projection, the height of said cylindrical projection substantially corresponding to the length of said end portion of the winding up to said heads; brackets connected to said heads and having supporting planes arranged at an angle to the internal surface of said cylindrical projection; wedges arranged between the surface of said cylindrical projection and the supporting planes of said brackets; and elastic means for supporting said wedges between said surface of said cylindrical projection and said supporting planes of said brackets.

2. A stator as claimed in claim 1, wherein on said internal surface of said cylindrical projection there are provided guide slots to receive said wedges, said guide slots being rectangular in cross-section and extending in the axial direction.

3. A stator as claimed in claim 1, wherein said wedge is provided with a protrusion on said side of said head of the end portion of said winding, said protrusion being intended to support said elastic member.

4. A stator as claimed in claim 1, wherein the elastic member is made from a non-magnetic titanium alloy having a modulus of elasticity between $1.10^6$ and $1.3.10^6$ kgf/cm$^2$.

5. A stator as claimed in claim 2, wherein said wedge is provided with a protrusion on the side of said head of said end portion of the winding, which protrusion is intended to support said elastic member.

6. A stator as claimed in claim 2, wherein said elastic member is made from a non-magnetic titanium alloy having a modulus of elasticity between $1.10^6$ and $1.3.10^6$ kgf/cm$^2$.

7. A stator as claimed in claim 3, wherein the elastic member is made from a non-magnetic titanium alloy having a modulus of elasticity between $1.10^6$ kgf/cm$^2$.

8. A stator as claimed in claim 5, wherein the elastic member is made from a non-magnetic titanium alloy having a modulus of elasticity between $1.10^6$ and $1.3.10^6$ kgf/cm$^2$.

* * * * *